United States Patent [19]

Gohda

[11] Patent Number: 4,609,982

[45] Date of Patent: Sep. 2, 1986

[54] POWER ON-OFF CONTROL CIRCUIT

[75] Inventor: Ken Gohda, Utsunomiya, Japan

[73] Assignee: Sharp Kabushiki Kaisha, Osaka, Japan

[21] Appl. No.: 655,640

[22] Filed: Sep. 28, 1984

[30] Foreign Application Priority Data

Jan. 19, 1984 [JP] Japan .................................... 59-8322

[51] Int. Cl.[4] ............................................ H02P 13/24

[52] U.S. Cl. ........................................ 363/89; 363/53; 323/303

[58] Field of Search ........................ 363/86, 89, 52, 53; 323/266, 276, 303; 361/90, 92

[56] References Cited

U.S. PATENT DOCUMENTS 3,754,182 8/1973 Morris et al. ........................ 323/299

4,493,000 1/1985 Edwards ............................... 361/92

FOREIGN PATENT DOCUMENTS 52-39152 3/1977 Japan .................................... 361/92

*Primary Examiner*—Peter S. Wong

*Assistant Examiner*—Judson H. Jones

*Attorney, Agent, or Firm*—Birch, Stewart, Kolasch & Birch

[57] ABSTRACT

A power ON-OFF control circuit comprises a power stabilizing circuit for stabilizing power applied from a power source, a supply circuit for supplying a control signal, a detecting circuit for detecting whether the power from the power source is inputted, a switching circuit for disabling the control signal in response to the output of the detecting circuit and a control circuit for controlling ON-OFF states of the power source in response to the switching circuit, the control circuit being connected to the power stabilizing circuit.

6 Claims, 3 Drawing Figures

POWER ON-OFF CONTROL CIRCUIT

BACKGROUND OF THE INVENTION

The present invention relates to a power ON-OFF control circuit and, more particularly, to a power the ON-OFF control circuit for controlling ON-OFF states of a power source such as a relatively small capacity power source which drives an electronic apparatus including a memory.

A power ON-OFF control circuit as shown in FIG. 1 is generally used for controlling the ON-OFF states of a power source. The power ON-OFF control circuit of FIG. 1 includes a power transformer T1, a rectifying diode D1, smoothing condensors C1 and C2, a current control transistor Tr1, a Zener diode D2, a resistance R1, a condensor C3, and a switching transistor Tr2.

A power stabilizing circuit in series comprises the power transformer T1, the rectifying diode D1, the smoothing condensors C1 and C2, the current control transistor Tr1, the Zener diode D2, the resistance R1, and the condensor C3 all operated to stabilize the power from the power source. The switching transistor Tr2 is inserted and connected between the base of the current control transistor Tr1 and the ground, and the switching transistor Tr2 operates to control the ON-OFF states of the power source based on the operation of the above-described power stabilizing circuit.

The power ON-OFF control circuit is connected to an AC (Alternating Current) power source through an AC plug P, and further, connected to a load L to which the power is applied from the AC power source. The power from the AC power source is switched on or off by a main power switch SW1.

The operation of the power ON-OFF control circuit of FIG. 1 will be described below.

When the main power switch SW1 is switched on, an "L" (Low) level control signal is applied to the base of the switching transistor Tr2, so that the switching transistor Tr2 is placed in the OFF state and the current control transistor Tr1 is placed in the ON state. Therefore, a rectifying output voltage Vcc1 at the collector of the current control transistor Tr1 is stabilized by the current control transistor Tr1 and transformed into a DC (Direct Current) voltage Vcc2, and the stabilized DC voltage Vcc2 is further applied to the load L.

When the main power switch SW1 is switched off, a "H" (High) level control signal is applied to the base of the switching transistor Tr2, so that the switching transistor Tr2 is placed in the ON state and the current control transistor Tr1 is placed in the cut-off state. Therefore, the rectifying output voltage Vcc1 is cut off by the current control transistor Tr1 and the DC voltage Vcc2 is not applied to the load L.

However, in the case where the AC plug P is pulled out or the main power switch SW1 is switched off while the "L" level control signal is applied to the base of the switching transistor Tr2, in other words, while the main power switch SW1 is switched on, the DC voltage Vcc2 applied to the load L is gradually decreased as being dependent on the decrease of the rectifying output voltage Vcc1 while the current control transistor Tr1 is continuously placed in the ON state. Because the rectifying output voltage Vcc1 is decreased with small vibration, the DC voltage Vcc2 is gradually decreased with small vibration, also.

If the load L includes a memory such as a semiconductor memory, the memory may be caused to malfunction by the vibration of the DC voltage Vcc2, or the memory contents of the memory may be destroyed.

SUMMARY OF THE INVENTION

Accordingly, it is an object of the present invention to provide an improved power ON-OFF control circuit for controlling the ON-OFF states of a power source which drives an electronic apparatus including a memory.

It is another object of the present invention to provide an improved power ON-OFF control circuit for a relatively small capacity power source.

It is a further object of the present invention to provide an improved power ON-OFF control circuit for protecting the memory contents of a memory that is included in an electronic apparatus from being destroyed by a voltage change when a power source is turned ON or OFF.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a power ON-OFF control circuit comprises stabilizing means for stabilizing power applied from a power source, supply means for supplying a control signal, detecting means for detecting whether the power from the power source is inputted, switching means for disabling the control signal in response to the output of the detecting means, and control means for controlling ON-OFF states of the power source in response to the switching means, the control means being connected to the power stabilizing means.

BRIEF DESCRIPTION OF THE DRAWINGS

The present invention will be better understood from the detailed descriptiongiven hereinbelow and the accompanying drawings which are given by way of illustration only, and thus are not limitative of the present invention and wherein.

DETAILED DESCRIPTION OF THE INVENTION

Figure 1:
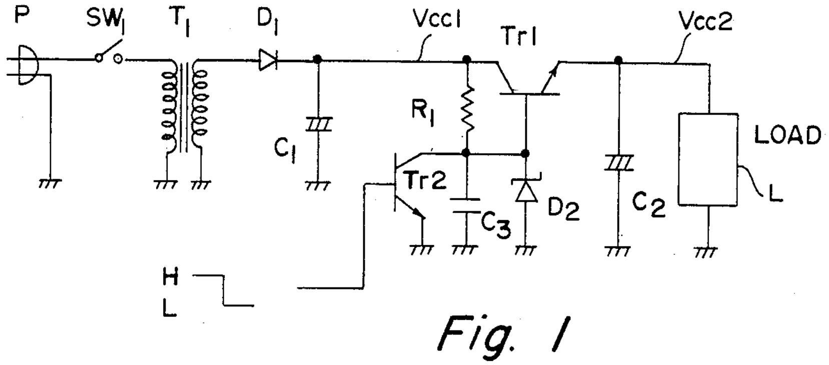
Fig. 1 PRIOR ART
FIG. 1 shows a circuit diagram of the power ON-OFF control circuit which is used generally.
Figure 2:
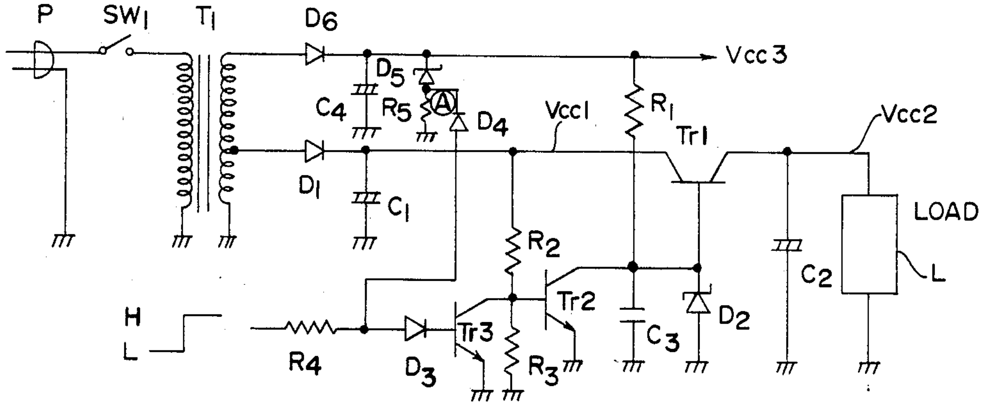
FIG. 2 shows a circuit diagram of a power ON-OFF control circuit according to an embodiment of the present invention.

FIG. 2 shows a circuit diagram of a power ON-OFF control circuit according to an embodiment of the present invention. Like elements corresponding to the parts of FIG. 1 are denoted by like reference characters in FIG. 2.

A power ON-OFF control circuit of the present invention comprises a power transformer Tr1, rectifying diodes D1 and D6, smoothing condensors C1, C2, and C4, Zener diodes D2 and D5, a current control transistor Tr1, switching transistors Tr2 and Tr3, resistances R'1, R2, R3, R4, and R5, a diode D3, and a switching diode D4.

The power ON-OFF control circuit is connected to a power source through a plug P and a main power switch SW1, and power from the power source is applied to a load L thorugh the power ON-OFF control circuit.

In the above power ON-OFF control circuit, one end of the resistance R'1 is connected to the base of the current control transistor Tr1, and the other end of the resistance R'1 is connected to an output terminal outputting a rectifying output voltage Vcc3 (Vcc3>Vcc1).

The rectifying diodes D1 and D6 are connected to the power transformer T1 so as to output from the rectifying diode D1 a voltage (Vcc1) less than a voltage (Vcc3) from the rectifying diode D6.

The base of the switching transistor Tr2 is connected to the collector of the current control transistor Tr1 through the resistance R2, and is grounded through the resistance R3. The reverse switching transistor Tr3 is inserted and connected between the base of the switching transistor Tr2 and the ground, and further, the "H" (High) level or "L" (Low) level control signal is applied to the base of the reverse switching transistor Tr3 through the resistance R4 and the diode D3. The connection between the resistance R4 and the diode D3 is connected to the portion Ⓐ between the Zener diode D5 and the resistance R5 through the switching diode D4. The rectifying diode D6 and the smoothing condensor C4 are provided for outputting the relatively high DC voltage Vcc3.

The operation of the above power ON-OFF control circuit of the present invention will be described below.

When the "H" level control signal is applied to the base of the reverse switching transistor Tr3 through the resistance R4 and the diode D3 in the condition that the main power switch SW1 is switched ON and is continuously placed in the ON state, the reverse switching transistor Tr3 is placed in the ON state and the electric potential of the base of the swtiching transistor Tr2 is decreased, so that the transistor Tr2 is placed in the cut-off state. The current control transistor Tr1 is placed in the ON state acording to the cut-off state of the switching transistor Tr2. Accordingly, the stabilized DC voltage Vcc2 is produced and introduced into the emitter of the current control transistor Tr1, and the stabilized DC voltage Vcc2 is applied to the load L.

On the contrary, when the "L" level control signal is applied to an anode of the diode D3 through the resistance R4, the diode D3 and the reverse switching transistor Tr3 are placed in the cut-off state. When the diode D3 and the reverse switching transistor Tr3 are placed in the cut-off state, a voltage at the base of the switching transistor Tr2 is increased, so that the switching transistor Tr2 is placed in the ON state. Therefore, the electric potential at the base of the current control transistor Tr1 is decreased, and the current control transistor Tr1 is placed in the cut-off state. Finally, the supply of the power voltage to the load L is stopped.

In this embodiment, the current control transistor Tr1 is placed in the ON or OFF state according to the "H" or "L" level control signal, respectively, so that the supply of the power voltage to the load L is controlled.

In the condition that the "H" level control signal is applied to the base of the switching transistor Tr3 through the resistance R4 and the diode D3, in other words, that the main power switch SW1 is switched on, the operation of the power ON-OFF control circuit when plug P is pulled out or the main power switch SW1 is switched off will be described below.

Figure 3:
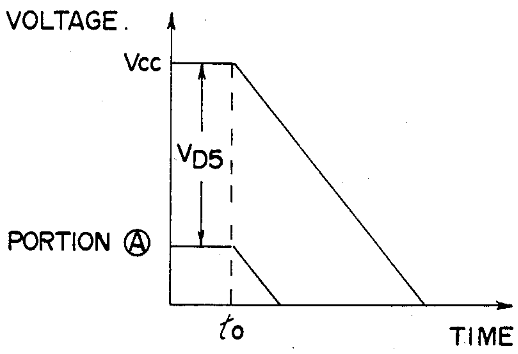
FIG. 3 shows a graph of a transient voltage characteristic for explaining the operation of the power ON-OFF control circuit of FIG. 2.

In case that the main power switch SW1 is switched off at a time t0, the rectifying output voltages Vcc1 and Vcc3 are decreased under predetermined time constants, respectively. In this time, the electric potential at the connection portion Ⓐ between the Zener diode D5 and the resistance R5 is decreased in proportion to the output voltage Vcc3 as shown in FIG. 3. At the same time, the switching diode D4 is placed in the ON state, and the diode D3 and the reverse switching transistor Tr3 are placed in the OFF state. Accordingly, the switching transistor Tr2 is quickly placed in the ON state, and the current control transistor Tr1 is placed in the cut-off state before the rectifying voltage Vcc1 is decreased less than the DC voltage Vcc2 which is applied to the load L.

As described above, in the above power ON-OFF control circuit, the switching transistors Tr2 and Tr3 are inserted and connected to the base circuit of the current control transistor Tr1 for the power stabilizing circuit in series, and the current control circuit Tr1 is turned ON or OFF by supplying the "H" or "L" level control signal, respectively, to the base of the switching transistor Tr3, so that the supply of the power voltage Vcc2 to the load L is controlled to be stopped or continued. Further, the Zener diode D5 and the resistance R5 are operated to detect whether the power voltages Vcc1 and Vcc2 are inputted. If the voltages Vcc2 and Vcc3 are not inputted, by switching ON the switching diode D4, the transistor Tr3 is placed in the OFF state and the transistor Tr2 is placed in the ON state, so that the current control transistor Tr1 is quickly placed in the OFF state. Therefore, the supply voltage Vcc2, without the vibration is applied to load L even when the power voltage Vcc1 is decreased with the vibration. If the power ON-OFF control circuit of the present invention is applied to the load L such as an electronic apparatus included a memory, memory contents of the memory is protected from being destroyed by a voltage change when the power is turned on or off, and the memory may function correctly.

The power ON-OFF control circuit of the present invention may be applied to television receiver, or the like.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A power ON/OFF control circuit comprising:

power supply means for providing an input voltage to an electronic apparatus;

dividing means for producing two output voltages from said input voltage wherein one of said output voltages is a reference voltage and a second of said output voltages is a driving voltage;

detection means for detecting the presence or absence of said reference voltage;

stabilizing means for stabilizing said driving voltage and applying said stabilized driving voltage to a load;

control means, operatively connected to said detecting means, for producing control signals in response to the presence or absence of an input voltage or the detection of said reference voltage by said detecting means; and switching means for turning said stabilizing means ON and OFF wherein said switching means is operatively connected to said control means and will turn OFF said stabilizing means when said control signals indicate an absence of said reference voltage or an absence of said input voltage.

2. The circuit of claim 1, wherein the stabilizing means includes a transistor.

3. The circuit of claim 1, wherein the control means includes a switching transistor.

4. The circuit of claim 1, wherein the detecting means includes a Zener diode and a resistance.

5. The circuit of claim 1, wherein the switching means includes a switching diode.

6. The circuit of claim 2, wherein the transistor is quickly placed in the cut-off state when the input voltage is interrupted.

* * * * *